United States Patent
Yamamoto et al.

(10) Patent No.: US 8,294,329 B2
(45) Date of Patent: Oct. 23, 2012

(54) POLYMER ACTUATOR

(75) Inventors: Jun Yamamoto, Tokyo (JP); Sotomitsu Ikeda, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 150 days.

(21) Appl. No.: 12/975,216

(22) Filed: Dec. 21, 2010

(65) Prior Publication Data

US 2011/0156530 A1   Jun. 30, 2011

(30) Foreign Application Priority Data

Dec. 24, 2009   (JP) .................................. 2009-292840

(51) Int. Cl.
*H02N 11/00* (2006.01)
(52) U.S. Cl. ........................................ 310/300; 310/309
(58) Field of Classification Search .................. 310/300, 310/309; 427/77
See application file for complete search history.

(56) References Cited

U.S. PATENT DOCUMENTS

| | | | |
|---|---|---|---|
| 4,922,164 A * | 5/1990 | Jacobsen et al. | 310/309 |
| 6,249,076 B1 * | 6/2001 | Madden et al. | 310/363 |
| 6,555,945 B1 * | 4/2003 | Baughman et al. | 310/300 |
| 6,960,864 B2 * | 11/2005 | Urano et al. | 310/307 |
| 7,239,065 B2 * | 7/2007 | Horst | 310/309 |
| 7,719,167 B2 * | 5/2010 | Kwon et al. | 310/328 |
| 2005/0212382 A1 * | 9/2005 | Odaka et al. | 310/309 |
| 2007/0247033 A1 | 10/2007 | Eidenschink et al. | |
| 2008/0129785 A1 * | 6/2008 | Hano et al. | 347/54 |
| 2008/0284277 A1 * | 11/2008 | Kwon et al. | 310/309 |
| 2010/0066203 A1 * | 3/2010 | Takeuchi et al. | 310/300 |

FOREIGN PATENT DOCUMENTS

| | | |
|---|---|---|
| JP | 2004-350495 A | 12/2004 |
| JP | 2009-28143 A | 2/2009 |
| JP | 2009-535093 T | 10/2009 |

* cited by examiner

*Primary Examiner* — Thanh Lam
(74) *Attorney, Agent, or Firm* — Canon U.S.A., Inc., IP Division (57) ABSTRACT

This invention provides a polymer actuator having a structure such that voltage can be efficiently applied to two or more actuator electrodes without directly providing an electrical contact point to an expanding and contracting portion.
An actuator has: an insulating base material 1; a first terminal 2 for energizing provided contacting the insulating base material; a first actuator electrode 4 provided contacting the first terminal; an electrolyte layer 5 provided contacting the first actuator electrode; a second actuator electrode 6 provided contacting the electrolyte layer; a second terminal 3 for energizing provided spaced apart from the first terminal and contacting the insulating base material; an energization preventing portion 7 for preventing energization of the first terminal and the second terminal; and a connecting portion 8 provided contacting the energization preventing portion in order to energize the second actuator electrode and the second terminal.

13 Claims, 8 Drawing Sheets

POLYMER ACTUATOR

BACKGROUND OF THE INVENTION

1. Field of the Invention

The present invention relates to a polymer actuator and a method for manufacturing the same.

2. Description of the Related Art

Conductive polymers or conductive polymer materials, such as polymer gels containing conductive materials, are known to produce electrochemical expansion and contraction action. Utilizing the phenomenon, an attempt of putting a flexible actuator (polymer actuator) into practical use has been progressed. The application of such a polymer actuator not only to small-sized substances, such as artificial muscles, robot arms, artificial arms, and micromachines but also to large-sized substances has drawn attention.

Japanese Patent Laid-Open No. 2004-350495 discloses, as a curve driver for medical use or industrial use, a polymer actuator having a conductive layer covering the outer circumferential surface of a resin tube, four conductive polymer layers covering the outer circumferential surface of the conductive layer, and an electrolyte layer covering each conductive polymer layer. However, Japanese Patent Laid-Open No. 2004-350495 does not disclose a specific connection measure for securely connecting each conductive polymer layer with an external power supply.

In order to address the problem, Japanese Patent Laid-Open No. 2009-28143 discloses a structure for increasing the contact between a lead wire and the conductive polymer layers by the elastic pressing force of a coil, which is provided on the periphery of an actuator. According to the structure of Japanese Patent Laid-Open No. 2009-28143, the secure contact between an actuator electrode and the lead wire is expected but, in order to achieve the secure contact, the structure requires two or more members, such as a coil, an insulating film for preventing the coil from being energized, and an end member for facing the pressing force from the coil. In addition, the structure has a problem in that the ends of expanding and contracting conductive polymer layers are directly pressed and thus a load is applied to the pressed portions during deformation of the conductive polymer layers, resulting in the fact that the actuator easily deteriorates.

SUMMARY OF THE INVENTION

The present invention provides a polymer actuator having a structure such that voltage can be efficiently applied to two or more actuator electrodes without providing an electrical contact point to an expanding and contracting portion.

The present invention relates to a polymer actuator, having: an insulating base material; a first terminal for energizing provided in contact with the insulating base material; a first actuator electrode provided in contact with the first terminal; an electrolyte layer provided in contact with the first actuator electrode; a second actuator electrode provided in contact with the electrolyte layer; a second terminal for energizing provided spaced apart from the first terminal and in contact with the insulating base material; an energization preventing portion for preventing energization of the first terminal and the second terminal; and a connecting portion provided in contact with the energization preventing portion in order to energize the second actuator electrode and the second terminal, in which when voltage is applied between the first terminal and the second terminal, the first actuator electrode, the electrolyte layer, and the second actuator electrode deform.

The present invention also relates to a method for manufacturing a polymer actuator which has an electrolyte layer between first and second actuator electrodes and in which the electrolyte layer and the first and second actuator electrodes deform by applying voltage between these electrodes, and the method includes the following processes (i) to (vii):

(i) a process for providing a first terminal for energizing in such a manner as to contact an insulating base material;

(ii) a process for providing a first actuator electrode in such a manner as to contact the first terminal;

(iii) a process for providing an electrolyte layer in such a manner as to contact the first actuator electrode;

(iv) a process for providing a second actuator electrode in such a manner as to contact the electrolyte layer;

(v) a process for providing a second terminal for energizing in such a manner as to be spaced apart from the first terminal and contact the insulating base material;

(vi) a process for providing an energization preventing portion for preventing energization of the first terminal and the second terminal; and (vii) a process for providing a connecting portion for energizing the second actuator electrode and the second terminal in such a manner as to contact the energization preventing portion.

According to the invention, the energization preventing portion and the connecting portion are provided so that the second actuator electrode and the second terminal are energized while maintaining an insulating state between the two actuator electrodes, i.e., the first and second actuator electrodes. Thus, both the two terminals energized to the corresponding actuator electrodes can be provided in such a manner as to contact the insulating base material.

By structuring as described above, the two actuator electrodes and the electrolyte layer can be deformed by applying voltage between the two terminals contacting the insulating base material without directly providing electrical contact points to the actuator electrodes.

Furthermore, a support member for supporting the polymer actuator or an electrically connecting member can be attached through the terminals and the insulating base material contacting the terminals and they do not need to be directly attached to expanding and contracting portions. Thus, a polymer actuator can be provided that has no concern about degradation of the connected portions due to repeated deformation and achieves simple electrical connection.

In particular, by structuring a columnar actuator structure in which a linear base material is disposed at the center as a core material and an electrolyte layer and an actuator electrode are disposed covering the circumference of the base material, the linear base material functions as the actuator tendon. Furthermore, by individually providing terminals to both ends of the linear base material, the terminals each can be used as access points with different electrodes. By converging both ends as described above, accumulation can be simply achieved.

Further features of the present invention will become apparent from the following description of exemplary embodiments with reference to the attached drawings.

BRIEF DESCRIPTION OF THE DRAWINGS

FIGS. 1A to 1B are views schematically illustrating a polymer actuator of the invention, in which

FIG. 8 are top views schematically illustrating converged polymer actuators formed by assembling a large number of the polymer actuators illustrated in FIG. 1, in which

DESCRIPTION OF THE EMBODIMENTS

Figure 1A:
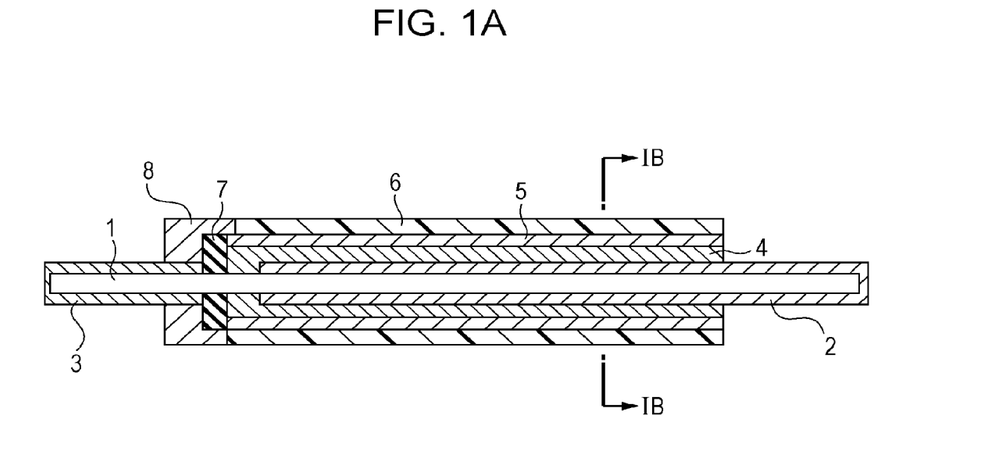
FIG. 1A is a side cross sectional view and FIG. 1B is a cross sectional view along the I-I' line of FIG. 1A.
Figure 1B:
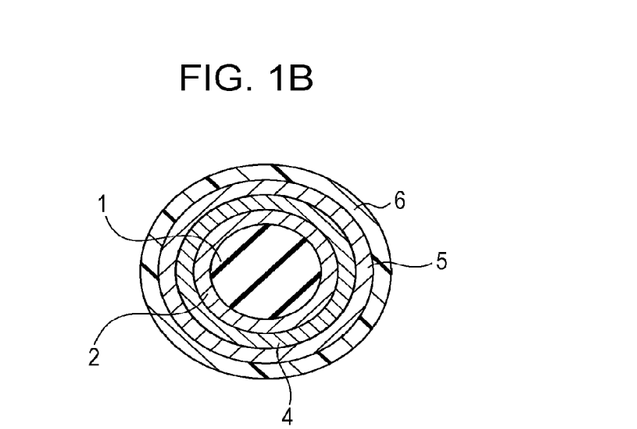
Figure 2A:
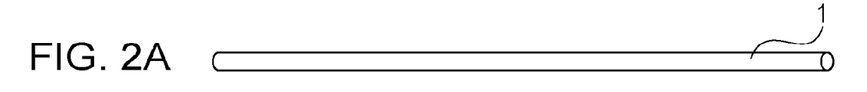
FIGS. 2A to 2E are views schematically illustrating a method for manufacturing the polymer actuator illustrated in FIG. 1.
Figure 2B:
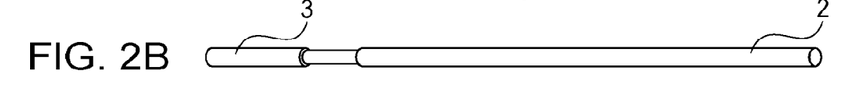
Figure 2C:
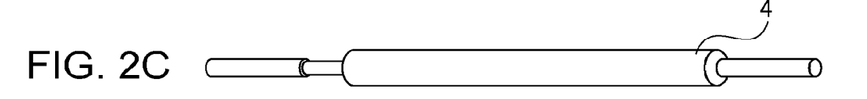
Figure 2D:
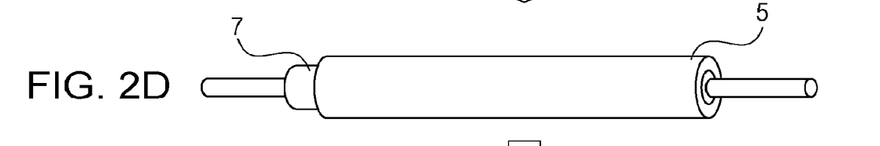
Figure 2E:
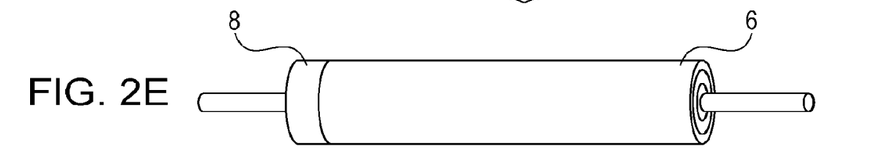
Figure 3:
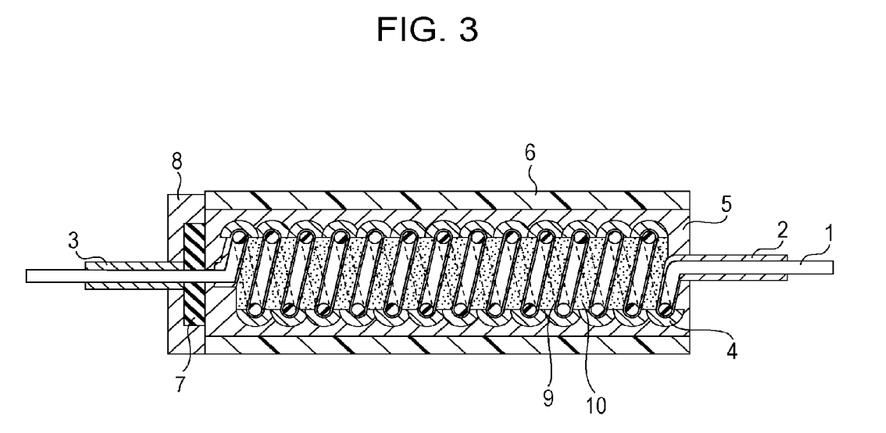
FIG. 3 is a view schematically illustrating a polymer actuator of a second embodiment.

Hereinafter, embodiments of the present invention will be described in detail with reference to FIGS. 1 to 4. FIG. 1 are views schematically illustrating a polymer actuator of the invention, in which FIG. 1A is a perspective view schematically illustrating the entire structure and FIG. 1B is a cross sectional view along the I-I' line of FIG. 1A. FIG. 2 are views schematically illustrating a typical method for manufacturing the polymer actuator illustrated in FIG. 1. FIG. 3 is a view schematically illustrating a modification of a polymer actuator.

1. Polymer Actuator

As illustrated in FIG. 1A, the polymer actuator of the invention has: an insulating base material 1; a first terminal 2 for energizing provided in contact with the insulating base material; a first actuator electrode 4 provided in contact with the first terminal; an electrolyte layer 5 provided in contact with the first actuator electrode; a second actuator electrode 6 provided in contact with the electrolyte layer; a second terminal 3 for energizing provided spaced apart from the first terminal and in contact with the insulating base material; an energization preventing portion 7 for preventing energization of the first terminal and the second terminal; and a connecting portion 8 provided in contact with the energization preventing portion in order to energize the second actuator electrode and the second terminal. When voltage is applied between the first terminal and the second terminal, the first actuator electrode 4, the electrolyte layer 5, and the second actuator electrode 6, which are deformation portions, deform.

As illustrated in FIGS. 1A and 1B, according to a suitable embodiment of the invention, the cylindrical first terminal 2 and the cylindrical second terminal 3 formed in such a manner as to cover the top of the insulating base material, the cylindrical actuator electrode 4 provided in contact with the top of the first terminal 2, the cylindrical electrolyte layer 5 formed on the actuator electrode, and the cylindrical second actuator electrode 6 formed on the electrolyte layer are disposed on the linear insulating base material 1 disposed at the center and extending in the longitudinal direction. As illustrated in FIG. 1B, the first actuator electrode 4, the electrolyte layer 5, and the second actuator electrode 6, which are deformation portions, are structured in such a manner as to cover the periphery in this order. Furthermore, in order to prevent energization of the first terminal and the second terminal, an energization preventing portion 7 is disposed on the insulating base material between the terminals and, in order to energize the second actuator electrode and the second terminal, a connecting portion 8 is provided in such a manner as to surround the circumference of the energization preventing portion.

As illustrated in FIG. 1B, the above-described components each are formed having a concentric cylindrical structure and constitute a cylindrical polymer actuator as a whole. Then, the first actuator electrode 4 and the second actuator electrode 6 are connected to the first and second terminals 2 and 3, respectively, and voltage is applied from the outside by the terminals. By the application of voltage between the first actuator electrode 4 and the second actuator electrode 6, the actuator elongates in the axial direction (longitudinal direction) and the displacement direction becomes one-dimensional, whereby the displacement amount can be adjusted with high efficiency.

As the insulating base material for use in the invention is suitably a base material having an electrical resistivity of $10^4$ $\Omega \cdot m$ or more and $10^{18}$ $\Omega \cdot m$ or lower. Or, the resistance between the terminal connection portions of the base material is suitably 1 k$\Omega$ or more.

As insulation properties as the base material required in the invention, the base material is required to have insulation properties with which the two terminals are not energized even when the two terminals are in contact with each other. More specifically, it is required that the surface of the portion which each terminal directly contacts on the base material and the surface of the portion where the conductive component, which each terminal contacts, contacts the base material have the above-described insulation properties. Regions inside the base material not participating to the above may have partially conductivity.

The base material suitably has stretching properties in such a manner as to follow the deformation of the deformation portions (the first actuator electrode 4, the electrolyte layer 5, and the second actuator electrode 6). A base material having high rigidity can also be used, but, in this case, the deformation portions need to be structured so that the deformation portions can deform independently from the base material.

Examples of suitable materials of the insulating base material include, when the base material itself has flexibility as the quality and expands and contracts, various rubber materials, such as crude rubber, isoprene rubber, butadiene rubber, styrene-butadiene rubber, butyl rubber, nitrile rubber, ethylene-propylene rubber, chloroprene rubber, acrylic rubber, chlorosulfonated polyethylene rubber, urethane rubber, silicone rubber, fluorocarbon rubber, ethylene-vinyl acetate rubber, and epichrome-hydrine rubber. Moreover, flexible materials having, as the skeleton, a polymer similar to the electrolyte layer described later may be acceptable.

Moreover, as materials exhibiting stretching properties when constituted as a structure, such as a spring or a coil, even when the base material itself has rigidity as the quality, resin materials, such as: general-purpose plastics, such as polyethylene, polypropylene, polyvinyl chloride, polystyrene, polyvinyl acetate, Teflon (registered trademark), ABS resin, AS resin, and acrylic resin, engineer plastics, such as polyamide, polyacetal, polycarbonate, polybutylene terephthalate, polyethylene terephthalate, and ethylene tetrafluoride, and super engineering plastics, such as polyphenylene sulfide, polytetrafloroethylene, polysulfone, polyethersulfone, polyetheretherketone, and polyamideimide are mentioned. Moreover, various ceramic materials, such as glass, alumina, zirconia, ferrite, forsterite, zircon, steatite, aluminum nitride, silicon nitride, and silicon carbide are mentioned.

The first and second terminals (2, 3) are formed with conductive materials. Examples of suitable conductive materials include various carbon materials, such as carbon black, or various metal materials, such as gold, platinum, palladium, ruthenium, silver, iron, cobalt, nickel, copper, and titanium. The terminals may be formed by applying a conductive slurry produced by kneading powder of these materials with an organic solvent or a resin binder onto the insulating base material and drying the same or may be formed as a bulk thin layer by plating, vapor deposition, sputtering, or the like.

When the insulating base material is formed with materials having stretching properties, such as rubber, and the base material itself deforms, it is suitable for the terminal portions to also have flexibility in such a manner as to follow shape changes. In such a case, the terminals are suitably formed with polymer materials obtained by kneading conductive materials and resin or polymer materials containing conductive polymers.

When the insulating base material is formed with resin or ceramic having a certain degree of rigidity, it is more suitable to directly form a bulk thin layer of gold, platinum, or the like, in the terminal portions because the conductivity can be enhanced.

The constituent materials of the two terminals may be the same or different from each other.

The actuator electrodes 4 and 6 disposed in contact with the corresponding terminals are formed with polymer materials having conductivity. Examples of the polymer materials having conductivity include polymer complexes containing conductive polymers or conductive materials.

The conductive polymers are not particularly limited and conductive polymer materials, such as polyaniline, polypyrrole, polythiophene, polyacetylene, and polyphenylene, can be mentioned, for example.

Examples of conductive materials for use in the polymer complexes include conductive materials, such as: various carbon materials, such as black lead, carbon black, acetylene black, Ketjenblack, carbon whisker, carbon fiber, carbon nanotube, and a carbon microcoil, powder (fine particles) of metals (e.g., gold, platinum, palladium, ruthenium, silver, iron, cobalt, nickel, copper, indium, iridium, titanium, and aluminum), metallic compounds (e.g., tin oxide, zinc oxide, indium oxide, stannic oxide, and ITO), metal fibers, and conductive ceramics materials. These conductive materials are contained alone or as a mixture thereof in the polymer complexes.

The polymers that can contain the conductive materials are not particularly limited insofar as they have flexibility with which the polymers can follow the movement of the actuator and are suitably polymers that are hard to hydrolyze and are stable in the atmosphere.

Examples of such polymers include polyolefin polymers, such as polyethylene and polypropylene; polystyrene; polyimide; polyarylenes (aromatic polymers), such as polyparaphenylene oxide, poly(2,6-dimethylphenyleneoxide), and polyparaphenylene sulfide; substances into which a sulfonic acid group (—SO$_3$H), a carboxy group (—COOH), a phosphate group, a sulfonium group, an ammonium group, and a pyridinium group are introduced, such as polyolefin polymer, polystyrene, polyimide, and polyarylenes (aromatic polymers), fluorine containing polymers, such as polytetrafluoroethylene and polyvinylidene fluoride; a perfluorosulfonic acid polymer, a perfluorocarboxylic acid polymer, and a perfluorophosphoric acid polymer in which a sulfonic acid group, a carboxyl group, a phosphate group, a sulfonium group, an ammonium group, a pyridinium group, and the like are introduced into the skeleton of fluorine containing polymers; polybutadiene compounds; polyurethane compounds, such as elastomers or gels; silicone compounds; polyvinyl chloride; polyethylene terephthalate; nylon; and polyarylate.

The polymer materials contained in the conductive materials can be constituted by combining the above-mentioned conductive materials and polymers, and two or more kinds of the conductive materials and two or more kinds of the polymer materials may be mixed and combined.

The above-mentioned conductive polymer materials and the conductive materials may be combined for use.

These electrode materials may contain the electrolyte described later therein in the formation thereof.

Moreover, the above-mentioned polymers are suitably polymers having a high compatibility with the electrolyte layer 5. Based on the fact that the compatibility and connection with the electrolyte layer 5 is high, a firmly-adhered actuator can be constituted. Therefore, the polymer is suitably a polymer having a polymer structure which is the same type as, similar to, or the same as that of polymer compounds constituting the electrolyte layer 5 or a polymer having a functional group which is the same type as, similar to, or the same as that of the polymer compounds.

At least one of the electrodes 4 and 6 may be formed as a layer containing only metal. When directly forming such electrodes on the electrolyte layer, the electrodes may be considered to be formed only with conductive materials. For these metal layers, materials, such as gold, platinum, palladium, ruthenium, silver, iron, cobalt, nickel, copper, indium, iridium, titanium, and aluminum, are mentioned. These layers may be formed as a thin metal layer by, for example, plating, vapor deposition, or sputtering.

As a particularly suitable aspect, a bucky gel obtained by mixing a carbon nanotube with polyvinylidene fluoride-hexafluoro propylene copolymer [PVDF (HFP)] or a polymer of polyvinylidene fluoride (PVDF) and an ionic liquid and forming a gel is suitably used for the actuator electrodes. The first and second actuator electrodes may be formed with the same material or different materials.

The electrolyte layer 5 may be structured in such a manner as to apply a potential difference between the first and second actuator electrodes and is suitably constituted by polymer materials holding an electrolyte. Examples of suitable materials constituting the electrolyte layer include flexible materials containing an electrolyte (i.e., substances that are ionic in a molten state) and a polymer-matrix material for holding a layer structure. Examples of materials constituting the above-described electrolyte layer include nonionic polymer compounds containing ionic substances or ion-conducting polymer compounds. In these materials, when electrical charges move in the presence of an electrical field and then current flows, ions serve as carriers of the electrical charges. By localization of ion molecules due to the movement of the ion molecules to either one or both of the actuator electrodes, the localized portion expands, and thus the polymer actuator deforms as a whole. In the invention, the first and second actuator electrodes and the electrolyte layer 5 are formed with flexible polymer materials. Thus, when at least one of the members deforms, the remaining members deform following the deformation.

Examples of polymers include fluorine containing polymers, such as tetrafluoroethylene and polyvinylidene fluoride; polyolefin polymers, such as polyethylene and polypropylene; polybutadiene compounds; polyurethane compounds, such as elastomers or gels; silicone compounds; thermoplastic polystyrene; polyvinyl chloride; and polyethylene terephthalate. The substances may be used alone or in combination of two or more kinds thereof, a functional group may be modified, and copolymers with other polymers may be acceptable.

Examples of ionic substances contained in these polymers include lithium fluoride, lithium bromide, sodium bromide, magnesium chloride, copper sulfate, sodium acetate, sodium oleate, and sodium acetate.

In addition, the ionic substances suitably contain tetrafluoroboric acid ion, hexafluorophosphate ion, trifluoromethanesulfonic acid ion, bis(trifluoromethylsulfonyl) imide ion or tris(trifluoromethylsulfonyl) imide ion, bis(trifluoromethylsulfonyl)methide ion or tris(trifluoromethylsulfonyl)methide ion, or salts thereof. As ions to serve as a pair of the above, lithium, sodium, and the like are used.

When an ionic liquid is used as the ionic substance, the durability during driving in the air increases, and thus the use of the ionic liquid is more suitable.

Here, the ionic liquid is also referred to as a room-temperature molten salt or simply referred to as a molten salt, exhibits a molten state in a wide temperature range including normal temperature (room temperature), and exhibits a molten state at, for example, 0° C., suitably −20° C., and more suitably −40° C. The ionic liquid suitably has high ion conductivity. Known various substances can be used for the ionic liquid but stable substances exhibiting a liquid state in an actually-used temperature range are suitable. Examples of suitable ionic liquid include an imidazolium salt, a pyridinium salt, an ammonium salt, and a phosphonium salt and the salts may be used alone or as a mixture.

Suitable examples of the electrolyte layer of the invention include one in which the ionic liquid is used for the electrolyte and a polyvinylidene fluoride-hexafluoro propylene copolymer [PVDF (HFP)] or a polyvinylidene fluoride (PVDF) is used as the polymer.

In order to achieve excellent adhesion with each actuator electrode (4, 6), it is also suitable to utilize polymer materials for use in the actuator electrodes as matrix materials of the electrolyte layer 5.

The energization preventing portion 7 is provided between both the first terminal and second terminal in order to prevent energizing of both the terminals. By providing the energization preventing portion 7 in contact with the insulating base material 1 on the insulating base material 1, the energization between the terminals by by-passing the laminated structure is prevented.

The energization preventing portion 7 may be structured using insulating materials. When structured using the same material as that of the electrolyte layer 5, a process is simplified. Furthermore, by using a portion where the electrolyte layer 5 extends in the second terminal direction as the energization preventing portion 7 and covering the periphery of the first actuator electrode 4 by the electrolyte layer 5 and the energization preventing portion 7, an electrical isolation state from the second terminal 3 can be achieved.

The connecting portion 8 is a member for energizing the second actuator electrode 6 and the second terminal 3 and is provided in contact with the top of the energization preventing portion 7. The connecting portion 8 may be formed with conductive materials and is suitably formed with materials having flexibility with which the connecting portion 8 can follow the deformation of the second actuator electrode 6. In particular, by constituting the connecting portion 8 with the same material as that of the second actuator electrode, connecting properties and strength against deformation can be maintained.

With the structure of the invention, even in the structure such that one actuator electrode is spaced apart from the base material as in the cylindrical structure of FIG. 1, the terminal that is energized to the actuator can be provided in contact with the insulating base material.

However, the invention is not limited to the above-described structure and two actuator electrodes may be formed so that both the actuator electrodes contact the insulating base material 1. Moreover, insulating base materials having a plane can also be used.

The size of the polymer actuator of the invention can be suitably selected according to the intended use. For example, a columnar polymer actuator having a cross section having a diameter of 1 μm to several tens of cm and a length in the longitudinal directions of 1 mm to several tens of cm can be produced.

The connection between the terminals of the invention and the terminal of an external power supply can be achieved by former connection methods, such as compression bonding. Since the terminals of the invention contact the insulating base material, the insulating base material serves as a support by the use of an external terminal that can hold an object, such as an alligator clip, and thus the terminals can be easily pressed.

2. Method for Producing Polymer Actuator

A method for manufacturing a polymer actuator of the invention has the following (i) to (vii) processes:

(i) a process for providing a first terminal for energizing in such a manner as to contact an insulating base material;

(ii) a process for providing a first actuator electrode in such a manner as to contact the first terminal;

(iii) a process for providing an electrolyte layer in such a manner as to contact the first actuator electrode;

(iv) a process for providing a second actuator electrode in such a manner as to contact the electrolyte layer;

(v) a process for providing a second terminal for energizing in such a manner as to be spaced apart from the first terminal and contact the insulating base material;

(vi) a process for providing an energization preventing portion for preventing energization of the first terminal and the second terminal; and (vii) a process for providing a connecting portion for energizing the second actuator electrode and the second terminal in such a manner as to contact the energization preventing portion.

Hereinafter, a method for manufacturing the columnar polymer actuator illustrated in FIG. 1 will be described in detail with reference to FIG. 2. FIG. 2 is a schematic view illustrating an example of the manufacturing method of the invention. First, as illustrated in FIG. 2A, an insulating base material 1 is prepared. As the insulating base material, a stretchable elastic body is suitably used. Subsequently, as illustrated in FIG. 2B, conductive materials serving as a first terminal 2 and a second terminal 3 are patterned on both ends of an electrically insulating base. By simultaneously forming the two terminals, the manufacturing process is simplified but the second terminal may be formed later in another process. Next, as illustrated in FIG. 2C, an actuator electrode 4 is disposed in a covering manner in such a manner as to contact the first terminal. Thereafter, as illustrated in FIG. 2D, the periphery of the first actuator electrode 4 is covered with an electrolyte layer 5. In the process, an energization preventing portion 7 is simultaneously formed. Then, as illustrated in FIG. 2E, a second actuator electrode 6 is provided on the periphery of the electrolyte layer 5. In the process, a connecting portion 8 is formed on the periphery of the energization preventing portion 7.

All the processes may be individually carried out but, as illustrated in FIG. 2 and in the above, 3 sets of (1) to (3) of (1) (i) process and (v) process (FIG. 2B), (2) (iii) process and (vi) process (FIG. 2D), and (3) (iv) process and (vii) process (FIG. 2E) can be simultaneously carried out and further using the same material. It is effective in simplification of the material cost and the manufacturing process to perform at least one of them.

As a method for manufacturing each component, layer formation processes, such as former known coating, sputtering, and immersion methods, can use suitably used.

3. Second Embodiment of Polymer Actuator

In the above-described polymer actuator, the columnar insulating base material is disposed at the center, the cylindrical first and second actuator electrodes (4, 6) are disposed concentrically with the columnar insulation base material 1, and the cylindrical electrolyte layer 5 is adhered between the first electrode and the second electrode, whereby the actuator is formed in a columnar shape as a whole. The polymer actuator of the invention can adopt various kinds of shapes, such as an elliptic columnar shape or a polygonal columnar shape, without being limited to the columnar shape.

In addition, the insulating base material may have a spiral-shaped linear base material. FIG. 3 is a cross sectional view of the second embodiment using an insulating base material having a coil-shaped spring-like structure.

As illustrated in FIG. 3, the columnar polymer actuator has a plastic insulating base material 1 having a coil-shaped spring-like structure at the center and having a linear structure at both ends. The coil-shaped spring structure is constituted in such a manner that a conductive material 9 is disposed on the surface so as to apply the voltage from the terminal 2 covering the linear structure, so that conductivity is given. The spaces between wire rods are filled with a polymer material 10, so that the actuator electrode 4 and the insulating base material 1 are compounded. More specifically, the actuator electrode 4 formed with the conductive material and the polymer material contacts the insulating base material. The actuator electrode 4 has the electrolyte layer 5 on the periphery thereof and further the actuator electrode 6 on the periphery of the electrolyte layer 5 similarly as in the above-described embodiment, and they are disposed in a concentric cylindrical shape.

The end of the coil structure opposite to the terminal 2 is also connected to the linear structure. The linear structure is covered with the terminal 3. At the connected portion, the energization preventing portion 7 is disposed instead of the conductive material 9 so that the terminal 3 and the actuator electrode 4 are not energized. The connecting portion 8 covers the periphery of the energization preventing portion 7, and is connected so that the actuator electrode 6 on the periphery and the terminal 3 are energized.

Figure 4A:
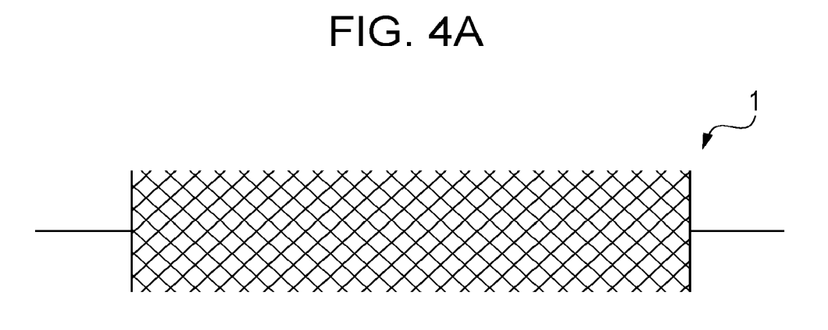
FIG. 4 are views schematically illustrating an insulating base material to be applied to the polymer actuator of the second embodiment.
Figure 4B:
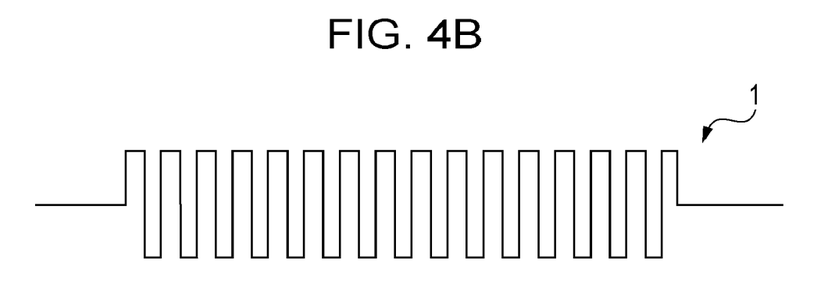

With the above-described structure, even when the size as an actuator is increased, a polymer actuator can obtain expansion and contraction or bending displacement sufficient as practical performance. Moreover, since the actuator of FIG. 3 contains a coil-shaped spring-like wire rod, the coil-shaped wire rod can function as a reinforcing member when external force is applied. Thus, an increase in mechanical strength can also be attempted. As the terminals 2 and 3, the same material as that of the actuator electrodes can also be used. In this case, it is important to constitute a terminal portion at a position sufficiently distant from deforming portions so that a portion serving as a terminal is not affected by the deformation of the actuator. The insulating base material may be a mesh-like planar base material as illustrated in FIG. 4A or a bellows-like linear base material as illustrated in FIG. 4B.

The insulating base materials stretch in the axial direction and suppress bending in a direction perpendicular to the axial direction when external force is applied, and thus are applicable to the actuator of the invention.

4. Third Embodiment of Polymer Actuator

In the polymer actuator of the above-described embodiment, at least one electrode layer can be formed as a layer containing metal.

Figure 5:
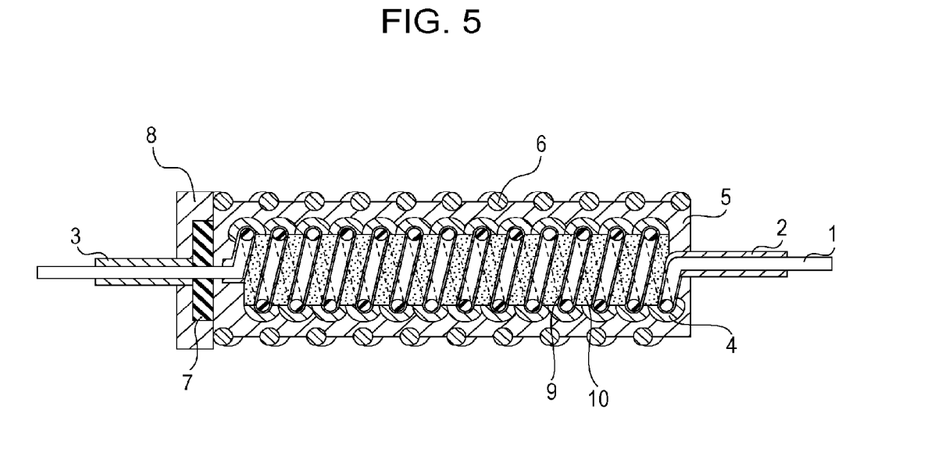
FIG. 5 is a view schematically illustrating a polymer actuator of a third embodiment.

FIG. 5 is a cross sectional view of the present invention when an insulating base material having a coil-shaped spring structure.

As illustrated in FIG. 5, a columnar polymer actuator 1 has a plastic insulating base material 1 having a coil-shaped spring-like structure at the center and having a linear structure at both ends. The coil-shaped spring structure is constituted in such a manner that a conductive material 9 is disposed on the surface so as to apply the voltage from the terminal 2 covering the linear structure, so that conductivity is given. The spaces between wire rods are filled with a polymer material 10, so that the actuator electrode 4 and the insulating base material 1 are compounded. More specifically, the actuator electrode 4 formed with the conductive material and the polymer material contacts the insulating base material. The actuator electrode 4 has the electrolyte layer 5 on the periphery and has the actuator electrode 6 on the periphery of the electrolyte layer 5 similarly as the above-described embodiment.

Here, the actuator electrode 6 contains only a metal material unlike the actuator electrode 4 containing a conductive material and a polymer material.

For these metal layers, the above-mentioned materials, such as gold, platinum, iron, nickel, and titanium, are mentioned. These metal layers may be directly formed as a thin metal layer on the electrolyte layer by, for example, plating, vapor deposition, and sputtering or a bulk body may be adhered to the electrolyte layer for use.

When the metal layer is directly formed as a thin layer on the electrolyte layer, some following properties to the operation of the actuator are achieved but, for example, the fact that the electric conductivity is likely to change in accordance with the distortion degree is to be considered. Therefore, the actuator electrode 6 is more suitably formed as a bulk body and has structurally elasticity. In FIG. 5, the actuator electrode 6 has a coil-shaped spring structure and is concentrically disposed on the outside of the insulating base material.

The end of the coil structure opposite to the terminal 2 is also connected to the linear structure. The linear structure is covered with the terminal 3. On the connected portion, the energization preventing portion 7 is disposed instead of the conductive material 9 so that the terminal 3 and the actuator electrode 4 are not energized. The periphery of the energization preventing portion 7 is covered with the connecting portion 8 and is connected so that the actuator electrode 6 on the periphery and the terminal 3 are energized.

With the above-described structure, even when the size as an actuator is increased, a polymer actuator can obtain expansion and contraction displacement sufficient as practical performance. Moreover, since the actuator of FIG. 5 contains a coil-shaped spring member on the periphery, the member is useful for protecting the structure inside the actuator and a coil-shaped wire rod can function as a reinforcing member when external force is applied, and thus the mechanical strength can be improved.

The actuator electrode 6 may have a mesh shape besides the spring shape or may be a bellows-like linear base material.

5. Forth Embodiment of Polymer Actuator

In the columnar polymer actuator of the above-described embodiment, the electrolyte layer can be formed as a layer formed with an electrolyte solution.

Figure 6:
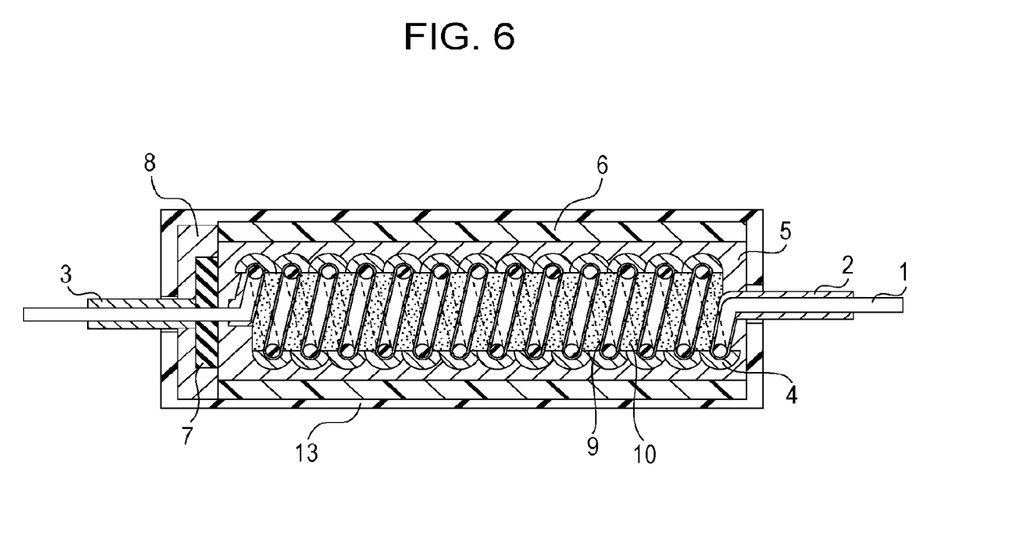
FIG. 6 are views schematically illustrating a polymer actuator of a fourth embodiment.

FIG. 6 is a cross sectional view of the invention when an insulating base material having a coil-shaped spring-like structure.

As illustrated in FIG. 6, a columnar polymer actuator 1 has a plastic insulating base material 1 having a coil-shaped spring-like structure at the center and having a linear structure at both ends. The coil-shaped spring structure is constituted in such a manner that a conductive material 9 is disposed on the surface so as to apply the voltage from the terminal 2 covering the linear structure, so that conductivity is given. The spaces between wire rods are filled with a polymer material 10, so that the actuator electrode 4 and the insulating base material 1 are compounded. More specifically, the actuator electrode 4 formed with the conductive material and the polymer material contacts the insulating base material.

Here, the electrolyte layer 5 of the actuator in this embodiment does not contain a polymer material holding an electrolyte and is formed only from a molten state ionic substance.

Further, in order to prevent the leak of an electrolyte layer in a molten state, a leak preventing portion 13 having a cylindrical structure and preventing permeation of an electrolyte is formed on the periphery of the columnar polymer actuator. The leak preventing portion is formed with resin or metals resistant to electrolyte ingredients and covers the polymer actuator only except for the projection portions of the terminal 2 and the terminal 3. As materials of the leak preventing portion, resin materials or ceramics materials for use in the insulating base material can be applied in addition to the above.

Examples of metals include gold, platinum, palladium, ruthenium, silver, iron, cobalt, nickel, copper, titanium, aluminum, and magnesium. Moreover, a complex structure such that metal materials are provided on the surface of resin materials.

The inner surface of the materials may be covered with, for example, polyethylene, such as low density polyethylene and high-density polyethylene, polypropylene, polyolefin containing the above, such as a polyethylene-polypropylene copolymer, polyvinyl chloride, polyvinylidene chloride, a copolymer of polyvinylidene chloride and polyvinyl chloride or methacrylic acid, polyacrylonitrile, and fluororesin that suppress the permeation of a solution or copolymers thereof, alloys thereof, or blends thereof.

When the leak preventing portion 13 is completely joined to the portions of the terminals 2 and 3, it is suitable for the leak preventing portion 13 itself to have stretching properties as a structure so as to follow the movement of the actuator. In such a case, it is more suitable for the leak preventing portion 13 to be flexible as the quality or have stretching properties as the structure, such as a bellows structure.

When the leak preventing portion 13 is not completely joined to at least one of the terminals 2 and 3 and has sliding properties, the leak preventing portion 13 itself does not always need to expand and contract so as to follow the movement of the actuator. In such a case, only a region of the insulating base material 1 where the actuator electrode 4 is formed expands and contracts. Thus, the leak preventing portion 13 is suitably structurally longer than a length equivalent to the deformation amount of the region of the insulating base material 1 where the actuator electrode 4 is formed. In order to give sliding properties to the contact portions of the leak preventing portion 13 and the terminals 2 and 3, the contact portions are suitably provided with flexible seal materials having resistance against ionic substances, such as rubber, for example.

The actuator electrode 6 on the periphery is formed on the inner circumferential surface of the leak preventing portion 13 and, structurally, the electrolyte layer 5 is provided on the periphery of the actuator electrode 4 and the actuator electrode 6 is provided on the periphery of the electrolyte layer 5 similarly as in the above-described embodiment. They are disposed in a concentric cylindrical shape.

The end of the coil structure opposite to the terminal 2 is also connected to the linear structure. The linear structure is covered with the terminal 3. On the connected portion, the energization preventing portion 7 is disposed instead of the conductive material 9 so that the terminal 3 and the actuator electrode 4 are not energized. The periphery of the energization preventing portion 7 is covered with the connecting portion 8 and is connected so that the actuator electrode 6 on the periphery and the terminal 3 are energized.

The two actuator electrodes need to be structured in such a manner that the space of the two actuator electrodes is specified so that energizing can always be prevented. For example, a structure in which at least one part of the leak preventing portion 13 is formed with materials having rigidity to thereby support the second actuator electrode 6 or a structure of providing an interval specifying member (spacer) that specifies the space between the actuator electrodes is also suitable.

When the leak preventing portion 13 itself or the innermost layer is formed with metals, the leak preventing portion itself may be considered as the actuator electrode 6.

With the above-described structure, even when the size as an actuator is increased, a polymer actuator can obtain expansion and contraction displacement sufficient as practical performance. Since, in the actuator of FIG. 6, the electrolyte layer does not contain a polymer material serving as the skeleton and is formed only with an ionic substance in a molten state, a mobility or diffusion distance of ions to the voltage application becomes higher. Therefore, an actuator having more excellent responsiveness or operation efficiency can be provided.

6. Fifth Embodiment of Polymer Actuator

The polymer actuator of the invention can adopt a structure in which a laminate of the actuator electrodes (4, 6) and the electrolyte layer 5 is deposited on an insulating base material having a plane without being limited to the columnar shape.

Figure 7A:
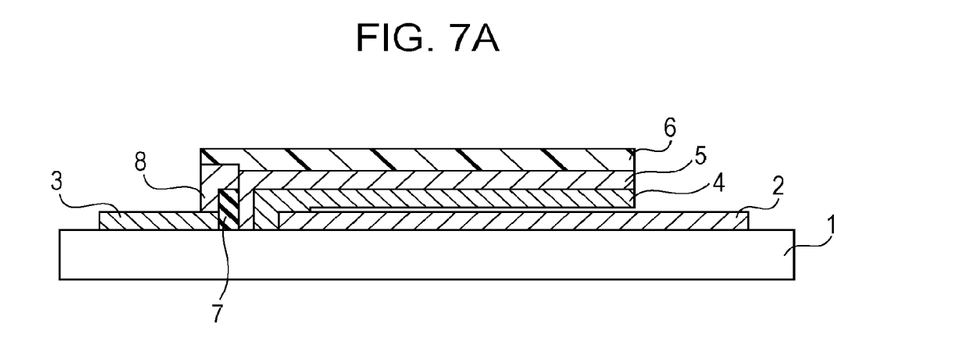
FIG. 7 is a view schematically illustrating a polymer actuator of a fifth embodiment.
Figure 7B:
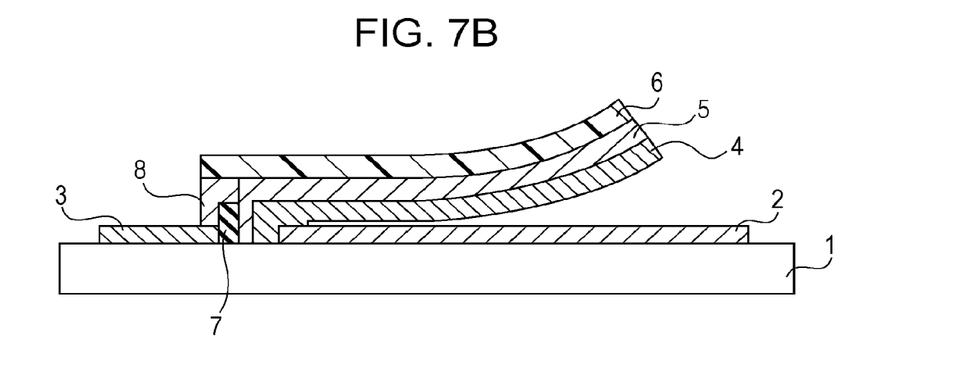

FIG. 7 are cross sectional views of the invention when a plate-like actuator is formed on an insulating base material 1 which is a plate-like substrate.

As illustrated in FIG. 7A, the plate-like actuator has a plastic plate-like insulating base material 1 as a substrate. On the substrate surface, the terminal 2 is disposed on the surface in such a manner that conductivity is given.

Furthermore, the actuator electrode 4 is formed in such a manner as to cover at least the terminal 2 on one end on the substrate plane. On the actuator electrode 4, the electrolyte layer 5 is provided and further the actuator electrode 6 is provided on the electrolyte layer 5 similarly as in the above-described embodiment, and they are disposed in a plate shape in which the insulating base material serves as the substrate.

The top of the insulating substrate opposite to the terminal 2 is covered with the terminal 3. On the connected portion, the energization preventing portion 7 is disposed so that the terminal 3 and the actuator electrode 4 are not energized. The connecting portion 8 covers the upper portion of energization preventing portion 7 and is connected so that the actuator electrode 6 on the upper portion and the terminal 3 are energized.

With the above-described structure, bending movement of the actuator as illustrated in FIG. 7B can be achieved. The structure can be considered to be utilized in various electron devices, such as relays or switches.

7. Polymer Actuator Containing Assembly of a Large Number of Polymer Actuators

A converged polymer actuator can be structured in which two or more of the columnar polymer actuators of the above-described embodiments are used and accumulated. Specifically, a converged polymer actuator is obtained by bundling the first terminals of a large number of the columnar polymer actuators and bundling the second terminals of a large number of the polymer actuators.

Figure 8A:
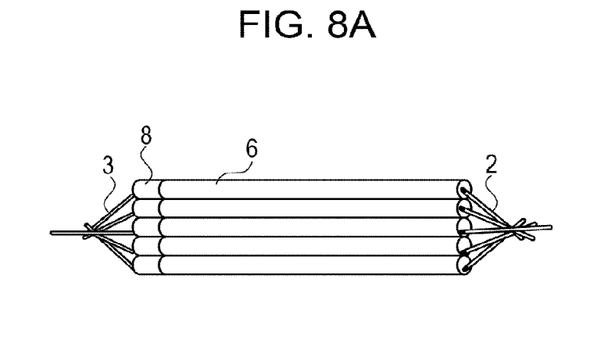
FIG. 8A is a view schematically illustrating a polymer actuator in which a large number of the polymer actuators are arranged and assembled in a row and FIG. 8B is a view schematically illustrating a converged polymer actuator formed by two-dimensionally bundling a large number of polymer actuators.
Figure 8B:
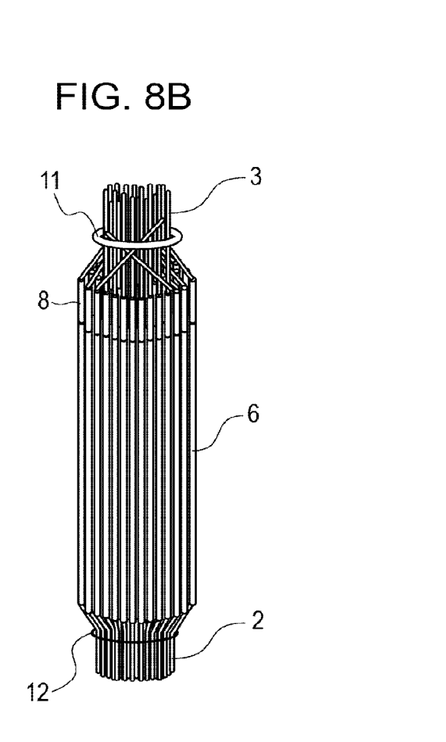

As illustrated in FIG. 8, when two or more of the polymer actuators are connected in parallel and converged, the power that can be taken out can be the total of the power per polymer actuator.

FIG. 8A is one in which two or more of the polymer actuators are arranged in a row. The terminals 2 and 3 are individually disposed at both ends of each actuator. Thus, when they are converged and twisted, the applied voltage of each actuator electrode of two or more elements can be made the same.

FIG. 8B illustrates a structure in which the polymer actuators are two-dimensionally disposed to the axial cross section. The terminals of the polymer actuators are converged by converging members 11 and 12, and the polymer actuators expand and contract in the axial direction by supplying voltage from the converging members. Similarly as muscle fibers of a living body, flexible and powerful deformation occurs.

The terminals of the polymer actuator may be bundled in any manner insofar as the terminals 2 or the terminals 3 have the same potential (i.e., positive or negative) without being limited to the accumulation manner illustrated in FIG. 8.

When two or more of assembled polymer actuators are mechanically connected in series, a large displacement amount can be taken out. Therefore, the actuators may be connected mechanically in parallel or mechanically in series according to the intended use.

The present invention is not limited to the above embodiments and various changes and modifications can be made within the spirit and scope of the present invention. Therefore to apprise the public of the scope of the present invention, the following claims are made.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2009-292840 filed Dec. 24, 2009, which is hereby incorporated by reference herein in its entirety.

What is claimed is:

1. A polymer actuator, comprising:
   an insulating base material;
   a first terminal for energizing provided in contact with the insulating base material;
   a first actuator electrode provided in contact with the first terminal;
   an electrolyte layer provided in contact with the first actuator electrode;
   a second actuator electrode provided in contact with the electrolyte layer;
   a second terminal for energizing provided spaced apart from the first terminal and in contact with the insulating base material;
   an energization preventing portion for preventing energization of the first terminal and the second terminal; and
   a connecting portion provided in contact with the energization preventing portion in order to energize the second actuator electrode and the second terminal, wherein
   when voltage is applied between the first terminal and the second terminal, the first actuator electrode, the electrolyte layer, and the second actuator electrode deform.

2. The polymer actuator according to claim 1, wherein the first actuator electrode is formed with a first polymer material having conductivity and the second actuator electrode is formed with a second polymer material having conductivity.

3. The polymer actuator according to claim 1, wherein the second actuator electrode is provided spaced apart from the insulating base material.

4. The polymer actuator according to claim 1, wherein the insulating base material is a linear base material extending in the longitudinal direction and has a columnar shape in which the first actuator electrode, the electrolyte layer, and the second actuator electrode are disposed in a covering manner in this order on the cross section in the longitudinal direction of the base material.

5. The columnar polymer actuator according to claim 4, wherein the first terminal and the second terminal are individually disposed on both ends of the linear base material.

6. The polymer actuator according to claim 5, wherein the insulating base material has a coil shape, a mesh shape, a bellows shape.

7. The polymer actuator according to claim 2, wherein the first actuator electrode, the electrolyte layer, and the second actuator electrode are formed with the same polymer material, an ionic liquid is contained at least in the electrolyte layer, and conductive materials are contained in the first and second actuator electrodes.

8. A method for manufacturing a polymer actuator which has an electrolyte layer between first and second actuator electrodes and in which the electrolyte layer and the first and second actuator electrodes deform by applying voltage between these electrodes, the method comprising the following processes (i) to (vii):
   (i) a process for providing a first terminal for energizing in such a manner as to contact an insulating base material;
   (ii) a process for providing a first actuator electrode in such a manner as to contact the first terminal;
   (iii) a process for providing an electrolyte layer in such a manner as to contact the first actuator electrode;
   (iv) a process for providing a second actuator electrode in such a manner as to contact the electrolyte layer;
   (v) a process for providing a second terminal for energizing in such a manner as to be spaced apart from the first terminal and contact the insulating base material;
   (vi) a process for providing an energization preventing portion for preventing energization of the first terminal and the second terminal; and
   (vii) a process for providing a connecting portion for energizing the second actuator electrode and the second terminal in such a manner as to contact the energization preventing portion.

9. The method for manufacturing a polymer actuator according to claim 8, wherein the actuator electrode in the (ii) process is formed with a first polymer material having conductivity and the second actuator electrode is formed with a polymer material having conductivity.

10. The method for manufacturing a polymer actuator according to claim 8, wherein the (i) process and the (v) process are simultaneously performed.

11. The method for manufacturing a polymer actuator according to claim 8, wherein the (iii) process and the (vi) process are simultaneously performed.

12. The method for manufacturing a polymer actuator according to claim 8, wherein the (iv) process and the (vii) process are simultaneously performed.

13. A converged polymer actuator, which is formed by an assembly of the polymer actuators of claim 1, wherein
   the first terminals of two or more of the polymer actuators are bundled, and
   the second terminals of the two or more of the polymer actuators are bundled.

* * * * *